UNITED STATES PATENT OFFICE.

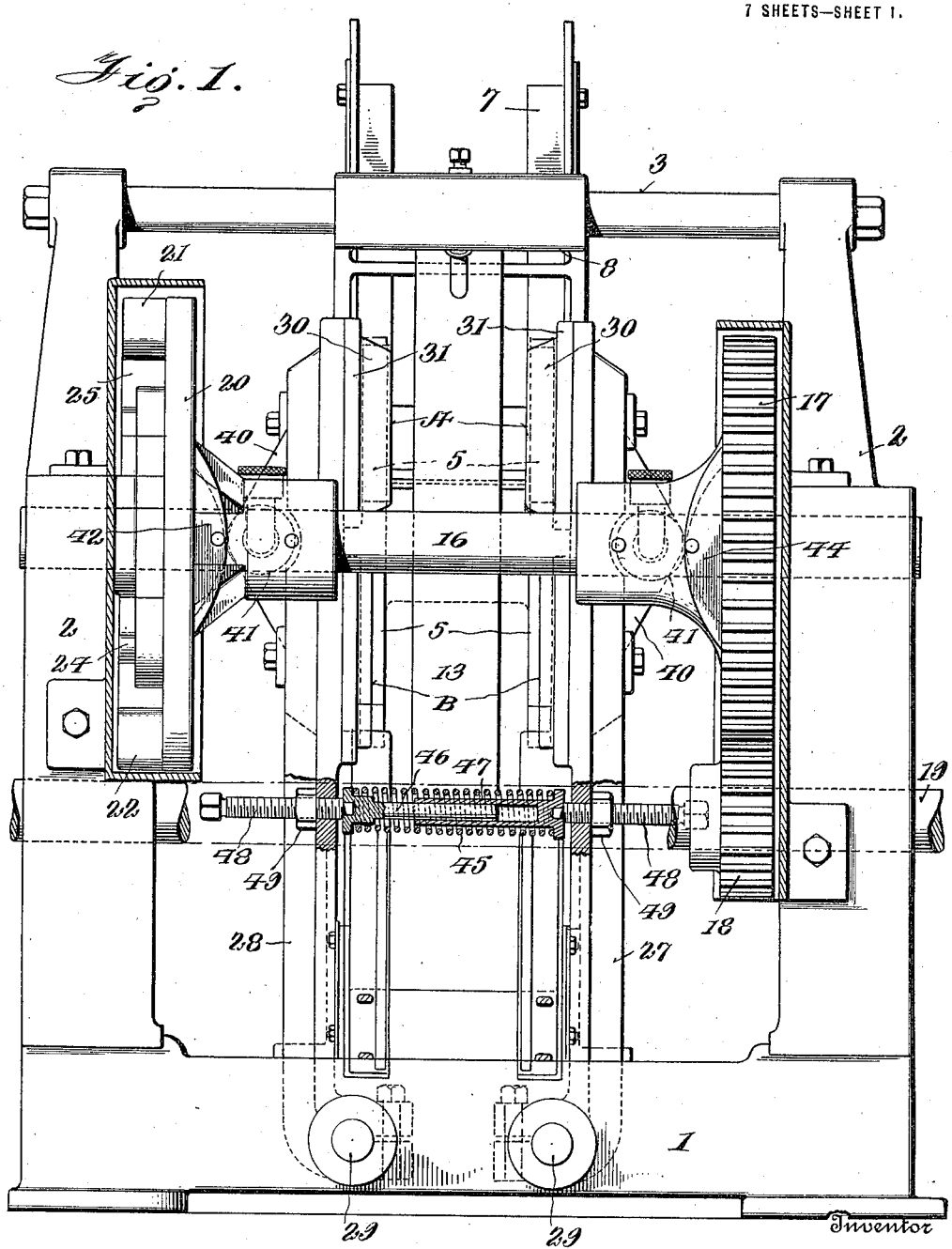

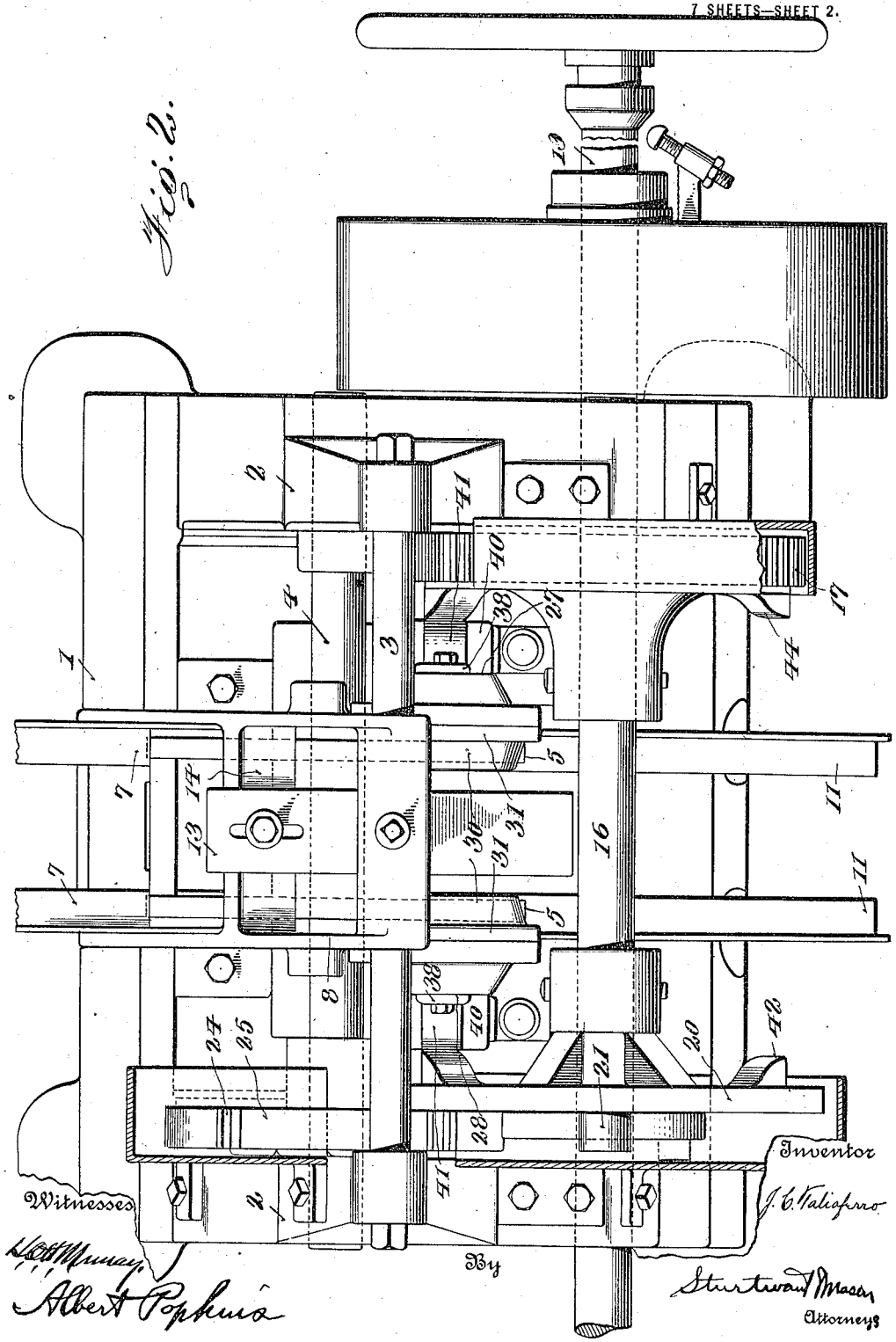

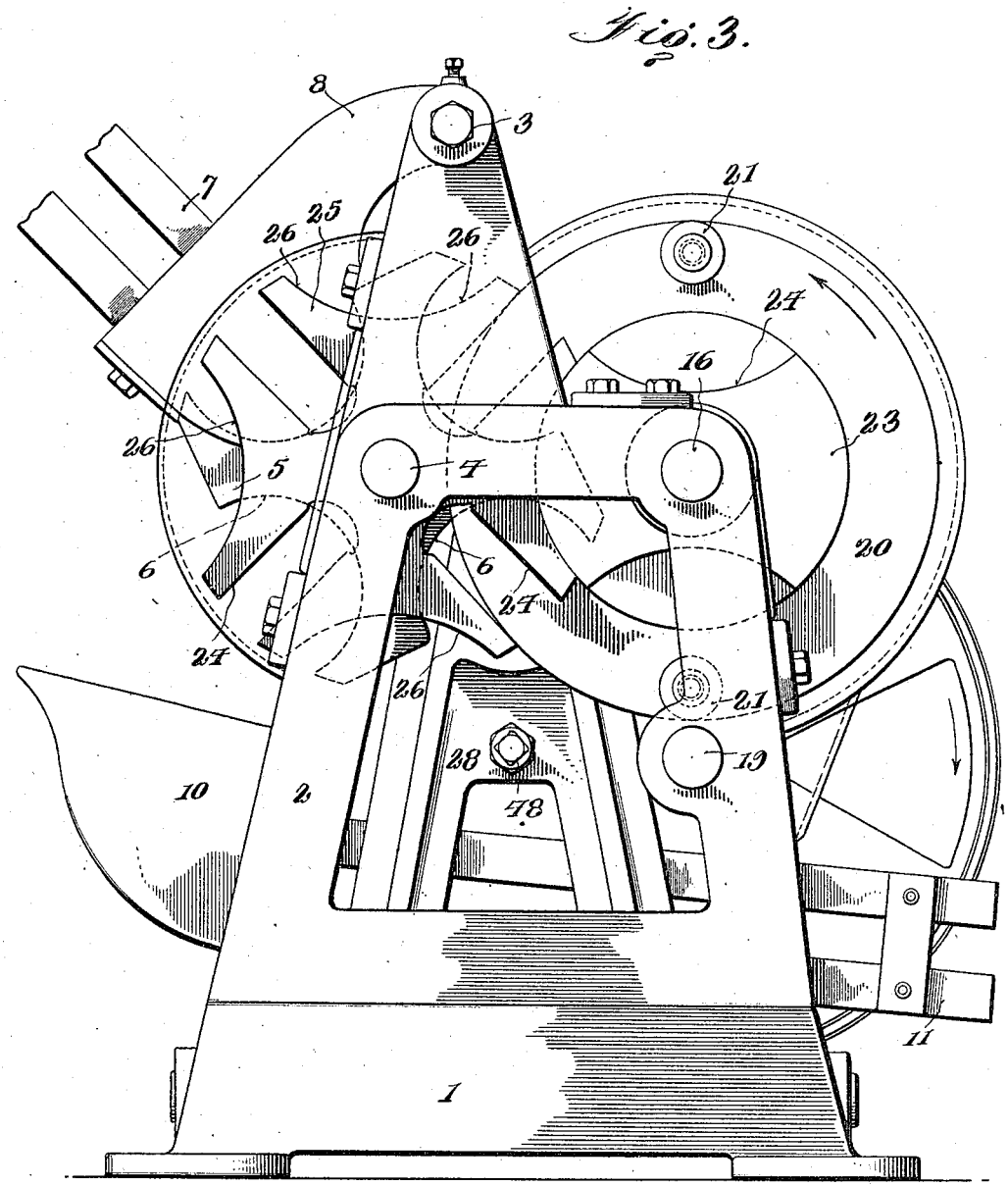

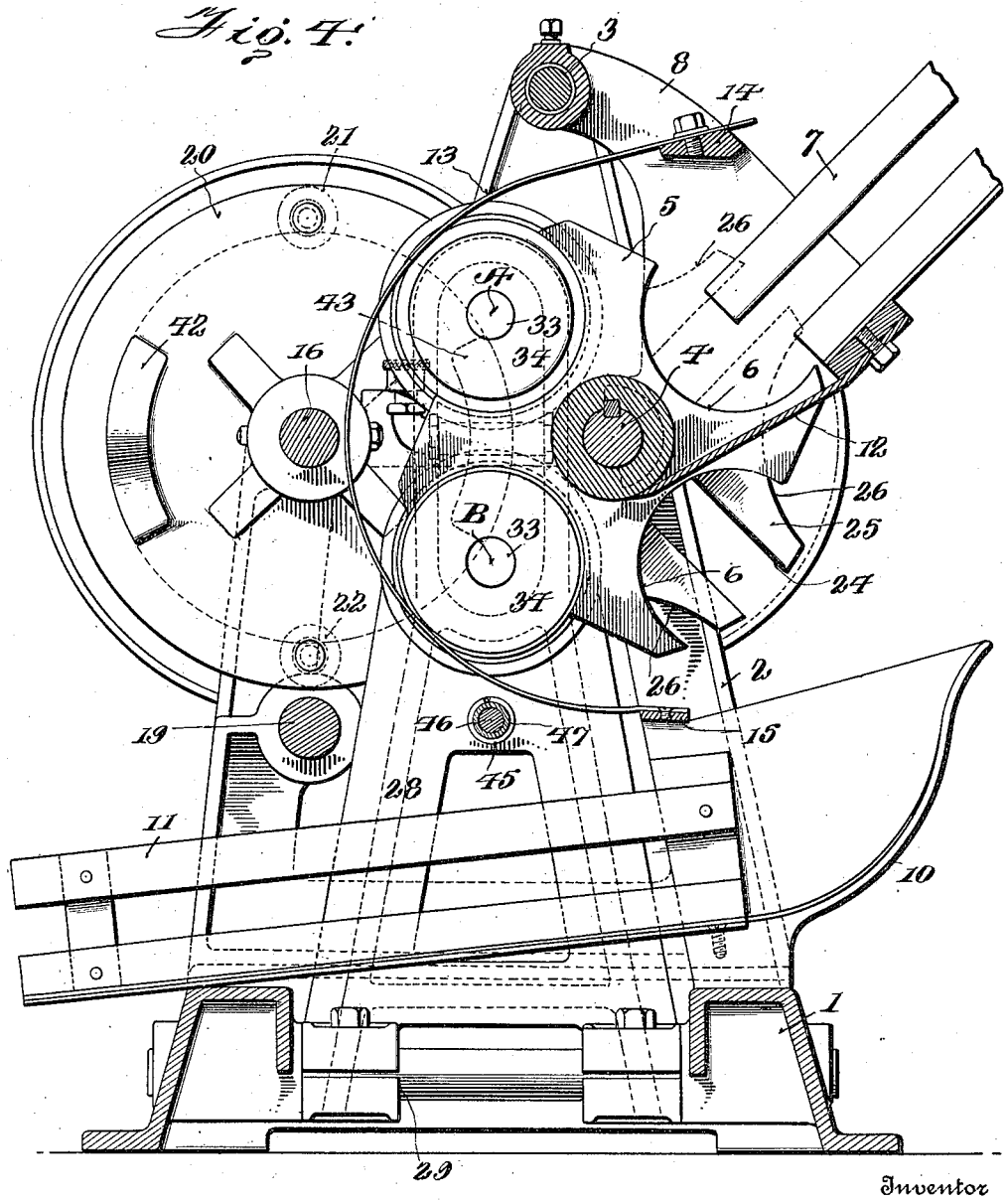

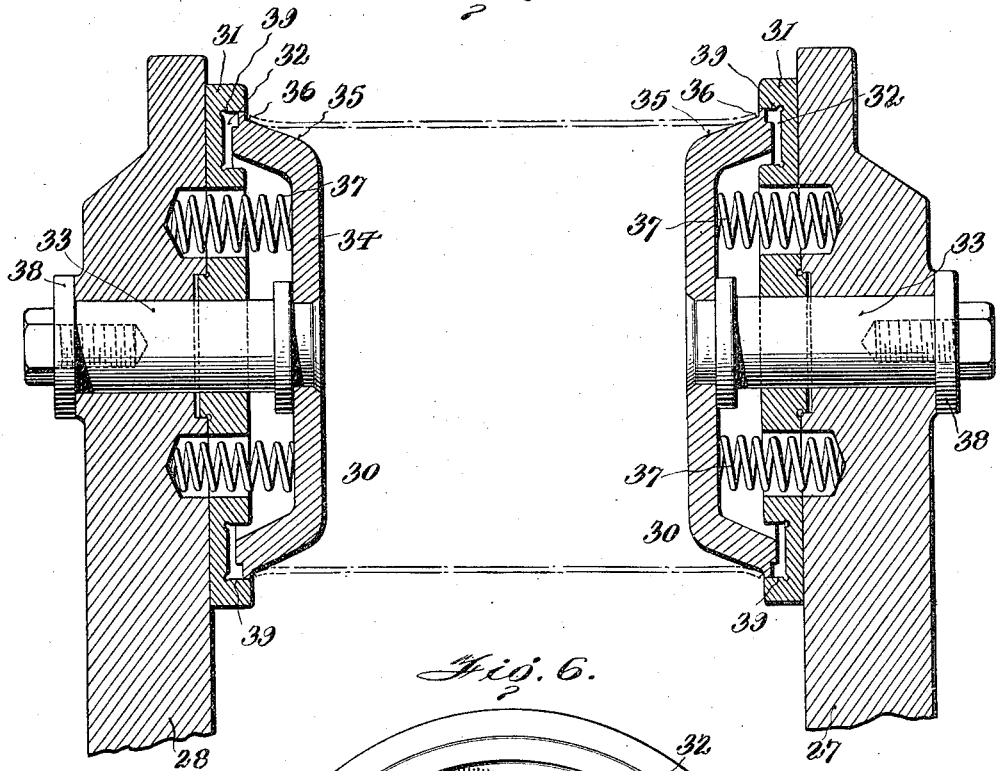
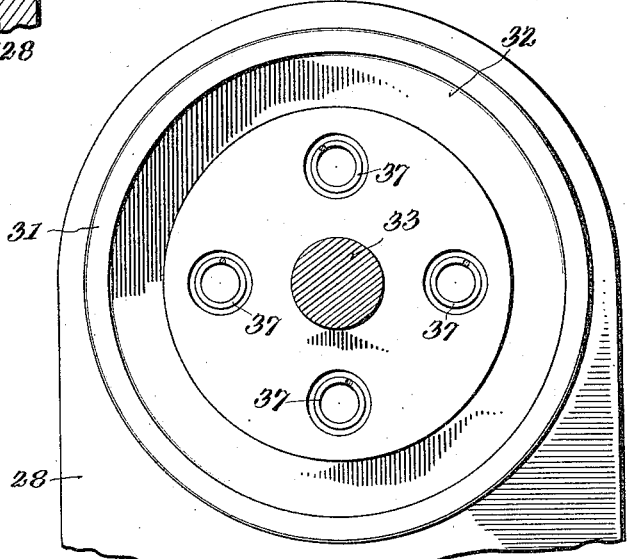

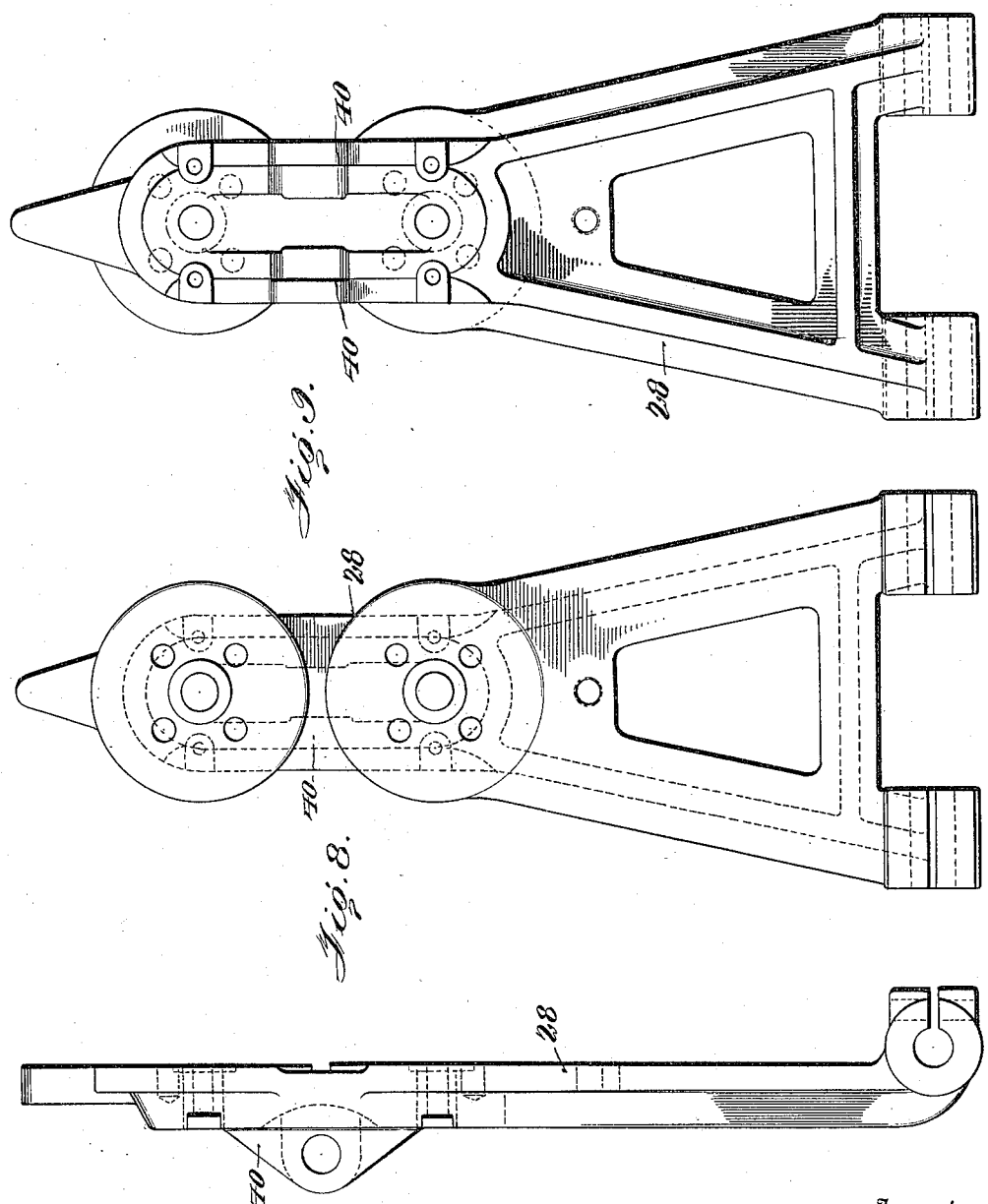

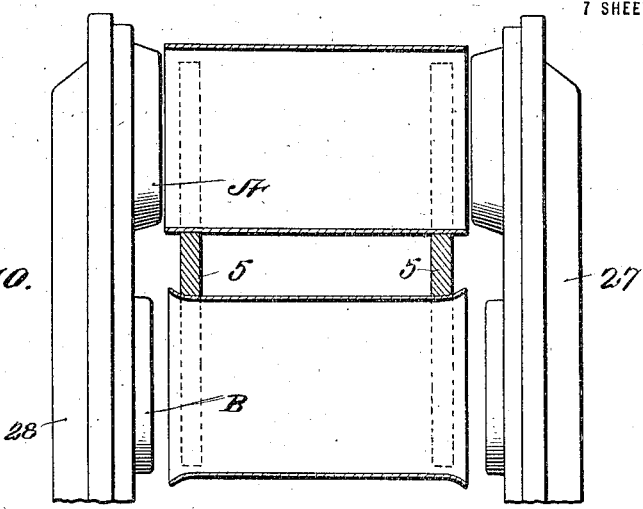
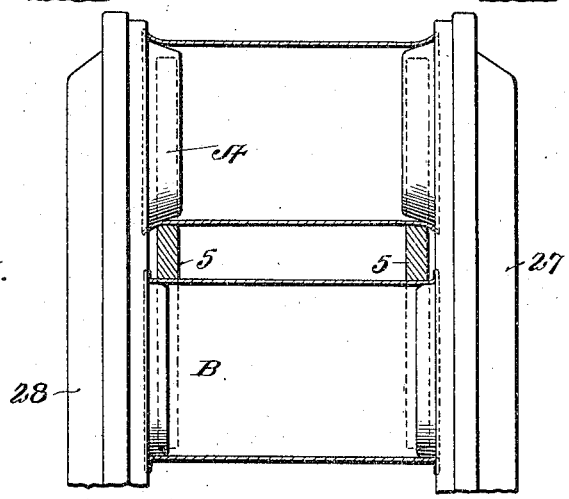
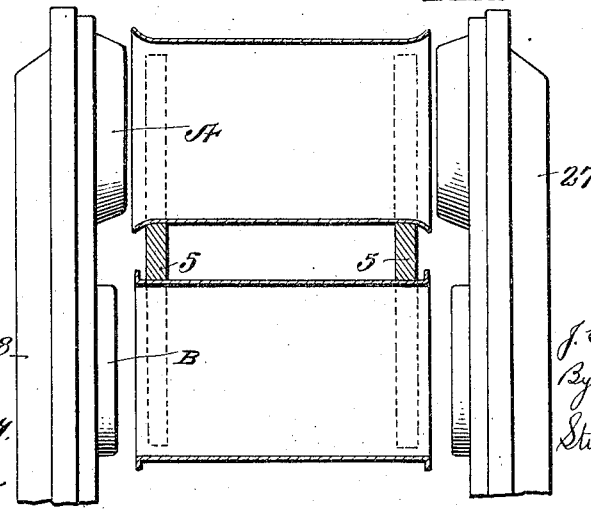

JOHN C. TALIAFERRO, OF BALTIMORE, MARYLAND, ASSIGNOR, BY MESNE ASSIGNMENTS, TO CONTINENTAL CAN COMPANY, INC., A CORPORATION OF NEW YORK.

AUTOMATIC FLANGING-MACHINE.

1,178,357.        Specification of Letters Patent.        Patented Apr. 4, 1916.

Application filed October 7, 1911. Serial No. 653,440.

*To all whom it may concern:*

Be it known that I, JOHN C. TALIAFERRO, a citizen of the United States, residing at Baltimore, in the State of Maryland, have invented certain new and useful Improvements in Automatic Flanging-Machines, of which the following is a description, reference being had to the accompanying drawing, and to the letters and figures of reference marked thereon.

The invention relates to new and useful improvements in flanging machines for can bodies, and more especially to flanging machines which are adapted to operate on large size can bodies, such as used in making gallon cans, although from certain aspects of the invention, the same is equally applicable to the flanging of smaller can bodies.

An object of the invention is to provide a machine which shall comprise comparatively few moving parts, which machine includes a plurality of flanging stations, together with a carrier for conveying the can bodies from one station to another, so that said can body may receive a preliminary flanging action at one station, and a subsequent finish flanging action at another station.

A further object of the invention is to provide a plurality of flanging stations coöperating with a common carrier, which flanging stations include movable heads, together with devices for simultaneously moving the heads, so that a plurality of can bodies in the carrier may be simultaneously acted upon.

A further object of the invention is to provide a flanging machine having a plurality of pairs of flanging heads, with common means for operating the same, together with an intermittently traveling carrier for delivering can bodies to the flanging heads, and for removing the can bodies from the flanging head after the flanging action is completed.

These and other objects will in part be obvious and will in part be hereinafter more fully described.

In the drawings which show by way of illustration one embodiment of the invention, Figure 1 is a front view of the flanging machine embodying my improvements, certain parts being shown in vertical section; Fig. 2 is a top plan view of the same; Fig. 3 is a side elevation of the same; Fig. 4 is a vertical sectional view centrally through the machine; Fig. 5 is a view showing in section two of the flanging heads and their relation to the can body before the flanging action occurs; Fig. 6 is a front view of one of the die heads, with the central portion removed; Fig. 7 is a side view of one of the levers for operating the flanging dies; Fig. 8 is a front view of the same; Fig. 9 is a rear view of the same; Fig. 10 is a diagrammatic view, showing the flanging dies, the can body and carrier before the flanging action occurs; Fig. 11 is a similar view, showing the dies moved forward to perform the flanging operation; and Fig. 12 is a similar view, showing the dies operated to release the flange of the can bodies.

In carrying out my invention, I have provided a supporting base 1, from which rise two standards 2, 2. These standards are connected at their upper ends by a cross bar 3. Mounted in suitable bearings in the standards 2, 2, is a shaft 4. On this shaft is mounted a carrier 5. This carrier consists of two members spaced so as to engage a can body adjacent each end thereof. Each of the spaced members is provided with a plurality of segmental pockets 6. As herein shown, I have provided the carrier with four segmental pockets.

The can bodies are delivered to the carrier from a runway 7, which is attached at its lower end to a bracket 8 mounted on the cross bar 3, at its upper end, and supported at its lower end by the shaft 4. The carrier 5 is rotated intermittently, so as to place one of the segmental pockets at the lower end of the runway 7, and after a can body is fed into the pocket, the carrier is rotated to convey the can body first to one flanging station and then another flanging station, and finally to the point of delivery. The can bodies as they are delivered from the carrier, drop into a receiver 10, which delivers the can bodies to a runway 11. These runways 7 and 11 may be the ordinary runways in a line of machines for performing various operations upon the can bodies, and said can bodies will be automatically delivered to the machine, the flanges formed thereon and automatically conveyed from the machine.

In order that the can bodies may be forced from the pockets, if for any reason they become locked therein, I have provided a stripper plate 12, which is attached to the bracket 8 and extends across the path of travel of the can body to a point underneath the shaft 4.

To assist in holding the can bodies in the carriers and prevent their dropping therefrom as the carrier moves from one flanging station to another, I have provided a flexible retaining member 13, which is adjustably secured to a cross bar 14, carried by the brackets 8. This flexible member 13 extends partially around the carrier, and is attached at 15 to a second cross bar which is mounted on the standards 2, 2. This flexible member may be so adjusted as to lightly engage the can bodies, and as the carrier rotates, they will be properly held seated in the pockets in the carrier.

The carrier 5 is intermittently rotated from a countershaft 16, which is mounted in suitable bearings in the standards 2, 2, and at a point substantially in front of the shaft 4. This countershaft 16 has a gear 17, which meshes with a gear 18 on the main shaft 19. These gears 17 and 18 may be proportioned so as to derive the proper speed and power from the main shaft 19. At the opposite end of the countershaft 16 from the gear 17, is a disk 20. This disk on its outer face carries two rollers 21 and 22. Also mounted on the shaft 16 and adjacent the disk 20, is another disk 23, which is formed with segmental recesses 24. Mounted on the shaft with the carrier 5 is a radially slotted stop wheel 25. This stop wheel is formed with segmental cut away portions 26, adapted to receive the outer surface of the disk 23 on the shaft 16, while the radial slots in the stop wheel receive the rollers 21 and 22. This is the ordinary Geneva stop motion, and will not need further description. As the shaft 16 rotates, first the roller 20 and then the roller 21 will engage a radial slot, and give the carrier 5 a quarter turn, and after the carrier has been moved a quarter turn, the disk 23 will engage the segmental cut away portions in the stop wheel, and lock the carrier against further movement. By this construction, the carrier is given one rotation to every two rotations of the shaft 16.

As herein shown, I have provided the machine with two flanging stations A and B. These flanging stations are arranged so that the dies at each station simultaneously operate upon the can bodies mounted in the carrier, and, therefore, each can body will in turn be subjected to the action of the dies at each flanging station. The flanging dies at each station are so shaped as to form first a preliminary curl, and then a final or finished flange in the can body.

The flanging dies, in the present embodiment of my invention, are mounted on two levers 27 and 28. These levers are each pivoted at 29 to the base of the machine, and extend vertically thereover. The levers are substantially parallel to each other. At the upper ends of the levers, I have provided a pair of flanging dies 30. These dies are similar in construction, and each consists of a plate 31, which may be of hardened steel. This plate 31 is secured to the end of the lever, and is formed with an annular recess 32 in its outer face.

Passing centrally through the plate 31 is a stud 33, which is loosely mounted in the lever so that it may move endwise therein. This stud carries at its outer end a die 34, which is formed with a cone-shaped surface 35 and a turning lip 36. Springs 37 are mounted in pockets formed in the lever and extend through apertures in the plate 31, and bear against the inner face of the die member 34. These springs normally press the die member outwardly, until a collar 38 carried by the stud 33 engages the outer face of the lever.

When a can body is pressed against the die, the die will be forced into the recess 32, compressing the springs 37 and the curl or flange on the body will be brought against the wall 39 of the plate 31, which serves as a limiting wall, and thereby determines the amount of curl or the length of the flange given to the can body. By this limiting wall, I am able to turn a flange at each end of the can body. If the metal offers less resistance at one end of the can body than the other, as soon as the finished flange is formed on this end, where there is the least resistance, the limiting wall will prevent any further turning of the flange, and a flange would then be formed at the other end of the can body.

The object of making the die portions 34 movable relative to the die plate 31, is to aid in stripping the can body with the finished flange thereon, from the flanging die. The levers carrying the dies are moved against the can bodies simultaneously by mechanism which will be hereinafter described.

The cone-shaped die member 34 moves into the end of the can body; said member yields to allow the flange to form; and after the flange is formed and the levers are moved away from each other to release the can body, said yielding member will move outward, thereby ejecting the finished flange from the recessed die plate.

The carrier 5 which supports the can bodies and presents the same to the dies, is formed with spaced supporting members, as noted above, and these supporting members engage the can bodies adjacent the ends thereof, so that if the yielding part of the die fails to strip the can body from the die, the supporting member at the opposite side of the carrier will engage the turned flange thereon and pull the can body from the die. I have, therefore, embodied in my machine, the flanging die having a yielding center, which ejects the can body from the flanging die, and can body supporting members, which not only present the can bodies to the dies, but which also strip the can bodies from the dies. By this mechanism I assure the full release of the can body from each flanging die, so that the same may be carried along with the carrier and presented to a second pair of flanging dies, or ejected from the machine. The second pair of flanging dies at the station B are also mounted on the levers 27 and 28, and are in all respects similar to the dies above described, except that the curvature of the flange-forming member is such as to form a finished flange on the can body, while the curvature of the dies in the first pair is such as to form a preliminary curl at each end of the can body. By this two-step method, wherein a preliminary curl is formed, and subsequently a finished flange is formed, I am able to turn a flange at each end of the can body which will lie substantially at right angles to the walls of the can body, without splitting the metal at the ends of the can body, or without straining or opening the side seams of the can body.

Where a flange is turned entirely about the can body in one operation, it is often found that metal being perhaps harder in some spots than others, is liable to split, which, of course, forms an imperfect can body, but by the above described two-step method, all liability of splitting, as above noted, is avoided.

In order to operate the levers which carry the flanging dies, I have provided each lever adjacent its upper end, with brackets 40, between which is mounted a roller 41.

On the outer face of the disk 20 are two cams 42 and 43. These cams are so located as to engage the roller 41 as the disk rotates. On the inner face of the gear wheel 7 are two similar cams 44, which engage the roller 41, mounted between the brackets 40 on the lever 27. These cams are so positioned as to operate simultaneously upon the two levers 27 and 28, and for each rotation of the shaft 16, said levers will be forced toward each other twice. The levers are separated by a spring 45. A rod 46 telescopes within a sleeve 47, and the spring 45 is mounted on the rod and sleeve, and engages a collar at the outer ends thereof.

The rod and sleeve are carried by screws 48, which extend through the levers, and are held in adjusted position by a set nut 49. This spring 45 serves to separate the levers after the flanging action has been performed, and will keep the rollers 41 in contact with the cams carried by the disk 20, and gear wheel 17, or against the face of the disk 20 and the face of the gear wheel 17 at points between these cams.

In the operation of my device, the can bodies to be flanged are placed in the runway 7. These can bodies will be carried by gravity downward into the segmental pockets 6, in the intermittent rotating carrier 5. As the carrier rotates, first one pocket and then another will be brought into register with the runway and receive a can body. The first quarter turn of the carrier will bring the can body to the flanging station A. The shaft 16 which operates the carrier 5 also operates the levers carrying the flanging dies, and the actuating parts are so disposed that the carrier is given a quarter turn when the levers are separated, and then the carrier remains at rest while the levers are moved toward each other to flange the can body. The can body brought to the seaming station A is operated upon by the flanging dies, and a preliminary curl formed in the end of the can body. As the levers separate, the movable parts of the dies will eject the can body therefrom, or the can body will be stripped from the dies by the supporting members of the carrier, which engage the can body adjacent each end, and the carrier will then convey the can body to the seaming station B.

The flexible retaining member 13 will hold the can bodies firmly in the pockets in the carrier, and, therefore, the carrier will properly position the can body at each seaming station. On the next forward movement of the levers, the can body having the preliminary curl thereon will receive a finished flange, and at the same time that this can body is given its finished flange, the second can body is receiving a preliminary curl at the seaming station A. A further movement of the carrier 5 will convey the can body with the finished flange to the point of discharge, and the can body will drop into the receiver 10, and will then be carried by gravity to the runway 11.

By the above construction, it will be noted that I have provided a machine which has a plurality of stationary flanging stations, and an intermittent carrier presents the can body to be flanged first to one station and then another, so that each can body by a series of operations has a finished flange formed thereon at each end thereof.

While I have designed my machine especially for use upon large can bodies, where considerable metal is turned during each flanging operation, it will be obvious that said mechanism is equally adapted for flanging smaller can bodies.

It is obvious that minor changes in the details of construction may be made, without departing from the spirit of my invention, as set forth in the appended claims.

Having thus particularly described my invention, what I claim as new and desire to secure by Letters Patent, is:—

1. In a flanging machine, the combination with a plurality of stationary flanging stations each including a movable head, a common lever upon which a movable head of each station is mounted, means for moving said lever to cause the heads to flange the can bodies, and means for presenting a can body first to one station and then another.

2. In a flanging machine, the combination of a plurality of pairs of flanging heads, a lever on which a flanging head in each pair is mounted, and means for moving said lever whereby the heads are caused to perform the flanging action.

3. In a flanging machine, the combination of a pair of levers, means for moving said levers toward each other, a plurality of pairs of flanging heads, one head in each pair being mounted on one of said levers, and the other head in each pair being mounted on the other lever, whereby the movement of the levers toward each other will cause said pairs of heads to simultaneously act upon the can bodies.

4. In a flanging machine, the combination of a pair of levers, means for moving said levers toward each other, a plurality of pairs of flanging heads, one head in each pair being mounted on one of said levers, and the other head in each pair being mounted on the other lever, whereby the movement of the levers toward each other, will cause said pairs of heads to simultaneously act upon the can bodies, an intermittently operated carrier for placing a can body first between one pair of heads and then another, whereby said can body may receive a plurality of flanging actions.

5. A flanging machine including in combination, a supporting frame, a pair of vertically arranged levers pivoted on the base of said supporting frame, a plurality of flanging heads carried by each lever, the flanging heads on one lever being opposed to the flanging heads on the other lever, the flanging heads on the levers being arranged one above the other, means for moving said levers toward each other, and means for presenting can bodies to said flanging heads.

6. A flanging machine including in combination, a supporting frame, a pair of vertically arranged levers pivoted on the base of said supporting frame, a plurality of flanging heads carried by each lever, the flanging heads on one lever being opposed to the flanging heads on the other lever, the flanging heads on the levers being arranged one above the other, a shaft rotating about a horizontal axis, cams carried by said shaft for engaging the outer face of said levers for forcing the same toward each other, and means for presenting can bodies to the flanging heads.

7. A flanging machine including in combination, a supporting frame, a pair of vertically arranged levers pivoted on the base of said supporting frame, a plurality of flanging heads carried by each lever, the flanging heads on one lever being opposed to the flanging heads on the other lever, the flanging heads on the levers being arranged one above the other, a shaft rotating about a horizontal axis, cams carried by said shaft for engaging the outer face of said levers for forcing the same toward each other, and an intermittently rotating carrier for receiving the can bodies and placing the same first between one pair of heads and then another.

8. A flanging machine including in combination, a supporting frame, a pair of vertically arranged levers pivoted on the base of said supporting frame, a plurality of flanging heads carried by each lever, the flanging heads on one lever being opposed to the flanging heads on the other lever, the flanging heads on the levers being arranged one above the other, a shaft rotating about a horizontal axis, cams carried by said shaft for engaging the outer face of said levers for forcing the same toward each other, an intermittently rotating carrier for receiving can bodies and placing the same first between one pair of heads and then another, said rotating carrier being positively actuated directly from the shaft carrying the cams, whereby the can bodies are presented to the can heads in proper timed relation to the actuation of the levers.

9. A flanging machine including in combination, a supporting base, standards carried thereby, an intermittently rotating carrier mounted in the standards, a can body chute for feeding can bodies to the carrier, a pair of flanging heads positioned for operation upon the can body while held by the carrier, levers on which said flanging heads are mounted, and a rotary shaft mounted on said standards, cams carried by said shaft for engaging the levers and moving the same toward each other when the carrier is at rest, and means carried by the shaft for intermittently rotating the carrier.

10. A flanging machine including in combination a supporting base, standards carried thereby, an intermittently rotating carrier mounted on said standards, said carrier including spaced brackets having segmental pockets, a can body chute for feeding can bodies to said pockets, a guard for holding the can bodies in said pockets, flanging heads positioned for operation upon the can bodies while in the pockets, a rotary shaft mounted in the standards, disks carried by said shaft, cams mounted on the disks, levers pivoted to the supporting base on which said flanging heads are mounted, said levers having means for engaging the cams on the disks, whereby the flanging heads are moved to flange the can bodies, and means for intermittently moving the carrier from the shaft carrying said disks.

11. A flanging machine including in combination, a supporting base, standards carried thereby, an intermittently rotating carrier mounted on said standards, said carrier including spaced members having segmental pockets, a can body chute for feeding can bodies to said pockets, a guard for holding the can bodies in said pockets, flanging heads positioned for operation upon the can bodies while in the pockets, a rotary shaft mounted in the standards, disks carried by said shaft, cams mounted on the disks, levers pivoted to the supporting base on which said flanging heads are mounted, said levers having means for engaging the cams on the disks, whereby the flanging heads are moved to flange the can bodies, and means for intermittently moving the carrier from the shaft carrying said disks, and means for positively ejecting can bodies from the pockets in the carrier.

12. A flanging machine including in combination, a supporting base, standards carried thereby, an operating shaft mounted in the standards, a carrier mounted on a horizontal rotating shaft, said carrier having spaced members formed with segmental pockets, a can body chute for feeding can bodies to the pockets, a guard for holding the can bodies in the pockets, a pair of vertical levers pivotally supported on the base, a plurality of flanging heads carried by each lever, and disposed so as to simultaneously operate upon can bodies carried in adjacent pockets in the carrier, while the carrier is at rest, a horizontally rotating shaft, disks mounted on the horizontal rotating shaft and operated from the main shaft, cams carried by said disks and engaging said levers for moving the same toward each other, means carried by said shaft carrying the disks for intermittently rotating the carrier, and means for ejecting the can bodies from the carrier after the flanging operation.

In testimony whereof I affix my signature, in the presence of two witnesses.

JOHN C. TALIAFERRO.

Witnesses:
MARY H. FARR,
CHAS. E. RIORDON.

Copies of this patent may be obtained for five cents each, by addressing the "Commissioner of Patents, Washington, D. C."